US012712761B2

(12) United States Patent
Mathew et al.

(10) Patent No.: US 12,712,761 B2
(45) Date of Patent: Aug. 18, 2026

(54) HEALTH-AWARE OVERLAY PACKET FORWARDING BETWEEN TUNNEL ENDPOINT (TEP) GROUPS

(71) Applicant: VMware LLC, Palo Alto, CA (US)

(72) Inventors: Subin Cyriac Mathew, San Jose, CA (US); Kaiwei Fan, San Jose, CA (US); Chidambareswaran Raman, Palo Alto, CA (US); Thea Corinne Rossman, Boulder Creek, CA (US); Shuomin Liu, Mountain View, CA (US)

(73) Assignee: VMware LLC, Palo Alto, CA (US)

( * ) Notice: Subject to any disclaimer, the term of this patent is extended or adjusted under 35 U.S.C. 154(b) by 2 days.

(21) Appl. No.: 18/930,908

(22) Filed: Oct. 29, 2024

(65) Prior Publication Data

US 2026/0121889 A1 Apr. 30, 2026

(51) Int. Cl.
*H04L 12/46* (2006.01)
*H04L 43/0876* (2022.01)
*H04L 45/125* (2022.01)

(52) U.S. Cl.
CPC ...... *H04L 12/4633* (2013.01); *H04L 43/0876* (2013.01); *H04L 45/125* (2013.01)

(58) Field of Classification Search
CPC ....................... H04L 12/4633; H04L 43/0876; H04L 45/125
See application file for complete search history.

(56) References Cited

U.S. PATENT DOCUMENTS 11,743,191 B1 8/2023 Mathew et al.
2016/0080502 A1* 3/2016 Yadav ................ H04L 41/0668 709/227
2022/0006734 A1* 1/2022 Wang .................. H04L 41/0895
2023/0026865 A1* 1/2023 Rolando ................ H04L 45/42
2023/0336377 A1* 10/2023 Hou .................... H04L 12/4641

* cited by examiner

*Primary Examiner* — Umar Cheema
(74) *Attorney, Agent, or Firm* — Kim & Stewart LLP

(57) ABSTRACT

Example methods and systems for health-aware overlay packet forwarding are described. In one example, a first computer system may monitor multiple paths between a first tunnel endpoint (TEP) group and a second TEP group. The first computer system may update health information to indicate that at least a first path is healthy, and a second path is unhealthy. In response to detecting an egress packet that is associated with a packet flow, the first computer system may map the egress packet to the first path instead of the second path based on the health information. The first computer system may generate and forward an encapsulated packet along the first path towards the second computer system, wherein the encapsulated packet includes the egress packet and an outer header that is addressed from a first TEP to a second TEP associated with the first path.

20 Claims, 10 Drawing Sheets

3

P1 170

| PATH-ij | TEP-Ai,TEP-Bj | STATE |
|---|---|---|
| PATH-00 | TEP-A0,TEP-B0 | HEALTHY |
| PATH-01 | TEP-A0,TEP-B1 | HEALTHY |
| PATH-02 | TEP-A0,TEP-B2 | HEALTHY |
| PATH-03 | TEP-A0,TEP-B3 | HEALTHY |
| PATH-10 | TEP-A1,TEP-B0 | HEALTHY |
| PATH-11 | TEP-A1,TEP-B1 | UNHEALTHY 142 |
| PATH-12 | TEP-A1,TEP-B2 | HEALTHY |
| **PATH-13** | **TEP-A1,TEP-B3** | **HEALTHY** 141 |
| PATH-20 | TEP-A2,TEP-B0 | HEALTHY |
| : | : | : |
| PATH-33 | TEP-A3,TEP-B3 | HEALTHY |

500

Host-A 210A

VM1 231 (IP-1)

VM2 232 (IP-2)

Hypervisor-A 214A

Health Monitoring Agent 218A

2

BFD State Table 520*

| | Ai=0 | i=1 | i=2 | i=3 |
|---|---|---|---|---|
| Bj=0 | ✓ | ✓ | ✓ | ✓ |
| j=1 | ✓ | ✓ | ✓ | ✓ |
| j=2 | ✓ | ✓ | ✓ | ✓ |
| j=3 | ✓ | ✓ | ✓ | ✓ |

Encap/Decap Handler 219A

3

Path Selection Table 530*

| | Ai=0 | i=1 | i=2 | i=3 |
|---|---|---|---|---|
| Bj=0 | 0 | 0 | 0 | 0 |
| j=1 | 1 | 1 | 1 | 1 |
| j=2 | 2 | 2 | 2 | 2 |
| j=3 | 3 | 3 | 3 | 3 |

GROUP1={TEP-Ai} 101

A0 110, A1 111, A2 112, A3 113

Host-B 210B

VM3 233 (IP-3)

VM4 234 (IP-4)

Hypervisor-B 214B

Health Monitoring Agent 218B

Encap/Decap Handler 218B

GROUP2={TEP-Bj} 102

B0 120, B1 121, B2 122, B3 123

* Health information associated with (PATH-ij)

1

BFD_PKT:PATH-ij =(TEP-Ai,TEP-Bj) 510

Physical Network 205

*Example healthy path selection*

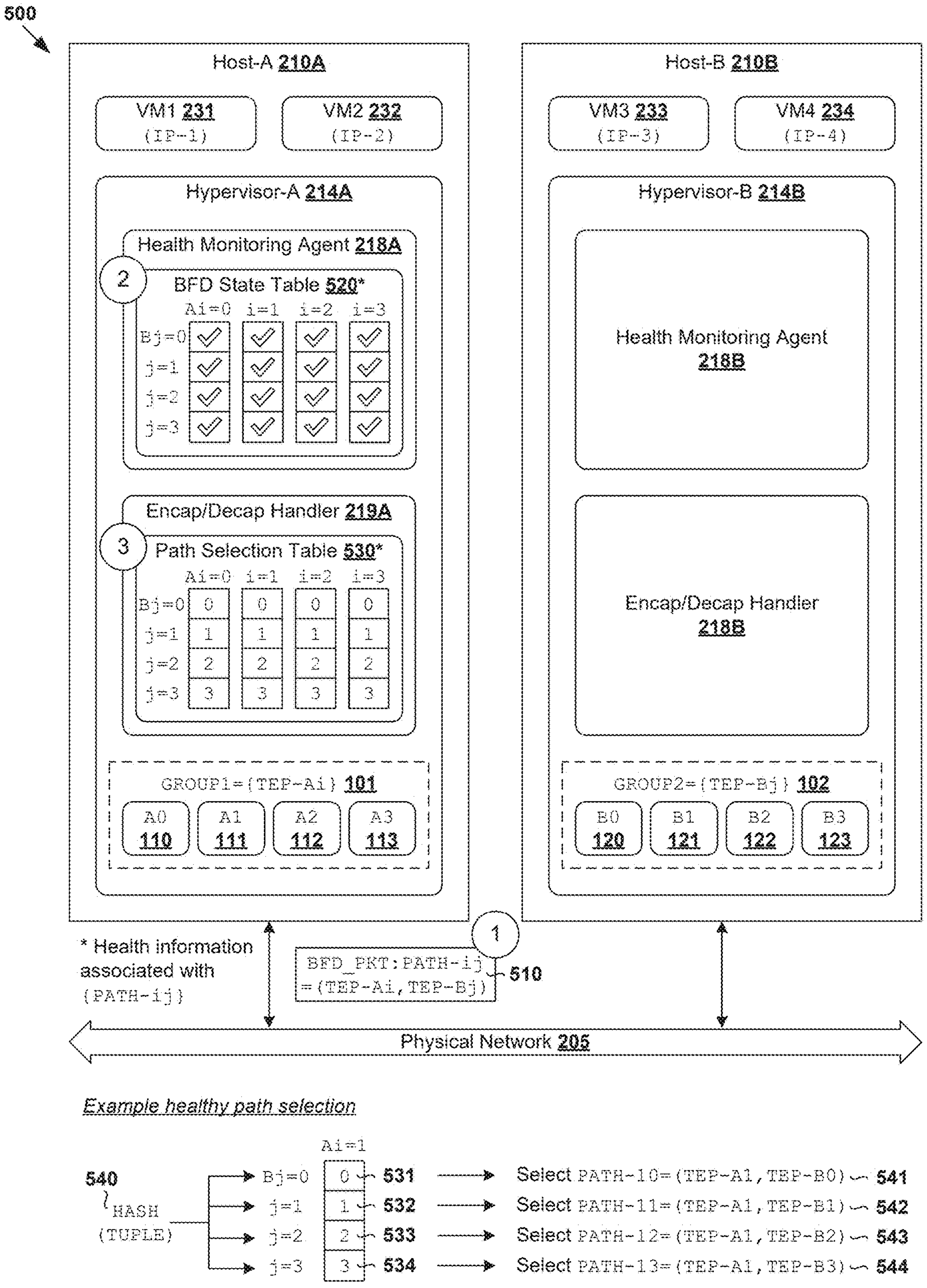

Host-A 210A

VM1 231 (IP-1)

VM2 232 (IP-2)

1

710 P1 SIP=IP-1 DIP=IP-3

Hypervisor-A 214A

Health Monitoring Agent 218A

BFD State Table 620

| | Ai=0 | i=1 | i=2 | i=3 |
|---|---|---|---|---|
| Bj=0 | ✓ | ✓ | ✓ | ✓ |
| j=1 | ✓ | ✗ | ✓ | ✓ |
| j=2 | ✓ | ✗ | ✓ | ✓ |
| j=3 | ✓ | ✓ | ✓ | ✓ |

Encap/Decap Handler 219A

2

Path Selection Table 630

| | Ai=0 | i=1 | i=2 | i=3 |
|---|---|---|---|---|
| Bj=0 | 0 | 0 | 0 | 0 |
| j=1 | 1 | 3 | 1 | 1 |
| j=2 | 2 | 0 | 2 | 2 |
| j=3 | 3 | 3 | 3 | 3 |

3

GROUP1={TEP-Ai} 101

A0 110 A1 111 A2 112 A3 113

Host-B 210B

VM3 233 (IP-3)

VM4 234 (IP-4)

770 P1

Hypervisor-B 214B

5

Health Monitoring Agent 218B

Encap/Decap Handler 218B

GROUP2={TEP-Bj} 102

B0 120 B1 121 B2 122 B3 123

4

750 O1 P1

OUTER_SIP=IP-TEP-A1
OUTER_DIP=IP-TEP-B3

760 O1 P1

Physical Network 205

*Example healthy path selection*

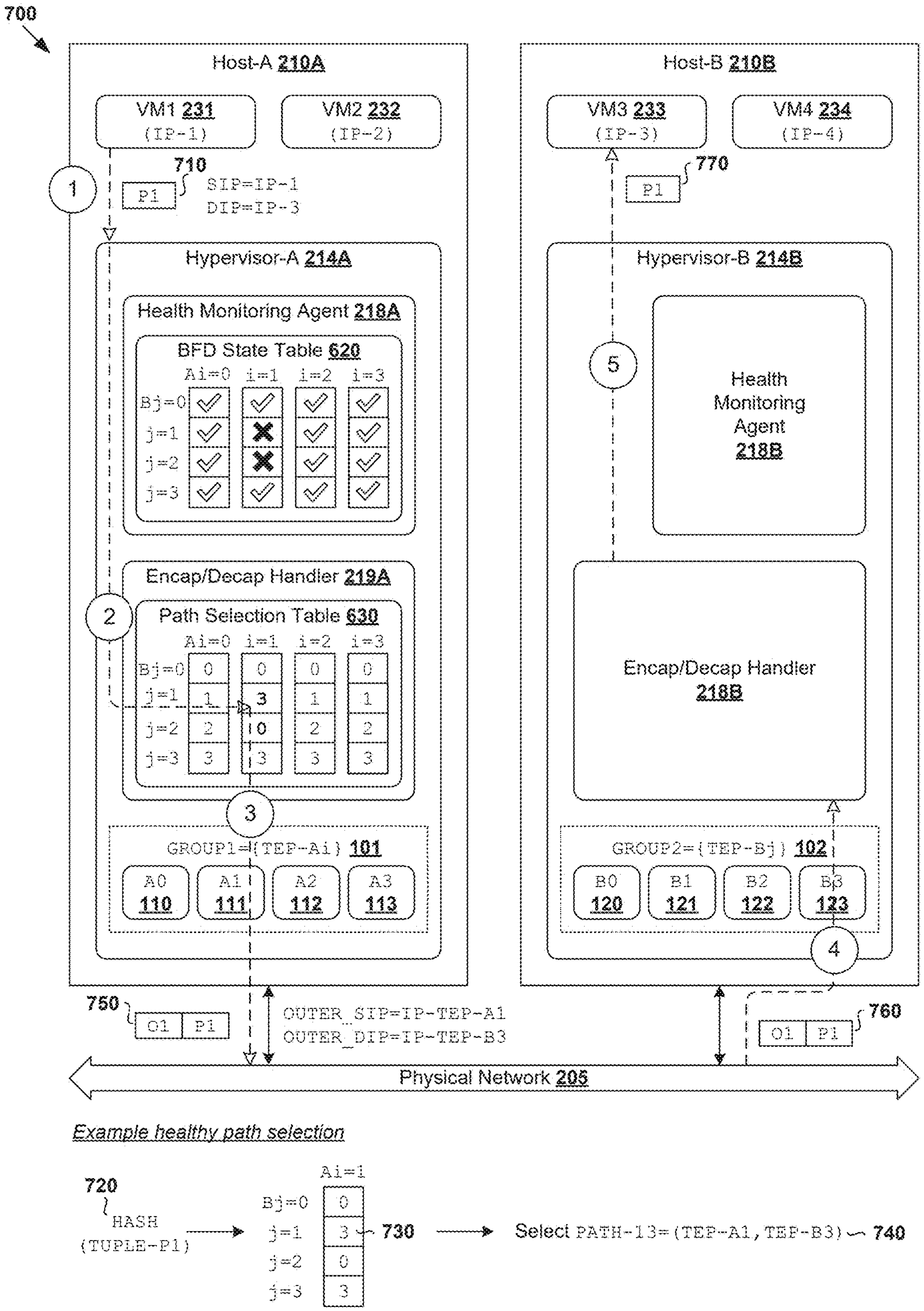

Host-A 210A

VM1 231 (IP-1)

VM2 232 (IP-2)

1

910

P2 SIP=IP-1 DIP=IP-4

Hypervisor-A 214A

Health Monitoring Agent 218A

BFD State Table 820

| | Ai=0 | i=1 | i=2 | i=3 |
|---|---|---|---|---|
| Bj=0 | ✓ | ✓ | ✓ | ✓ |
| j=1 | ✓ | ✗ | ✓ | ✓ |
| j=2 | ✓ | ✗ | ✓ | ✓ |
| j=3 | ✓ | ✓ | ✓ | ✗ |

Encap/Decap Handler 219A

2

Path Selection Table 830

| | Ai=0 | i=1 | i=2 | i=3 |
|---|---|---|---|---|
| Bj=0 | 0 | 0 | 0 | 0 |
| j=1 | 1 | 3 | 1 | 1 |
| j=2 | 2 | 0 | 2 | 2 |
| j=3 | 3 | 3 | 3 | 0 |

3

GROUP1={TEP-Ai} 101

A0 110 A1 111 A2 112 A3 113

Host-B 210B

VM3 233 (IP-3)

VM4 234 (IP-4)

960

P2

Hypervisor-B 214B

Health Monitoring Agent 218B

5

Encap/Decap Handler 218B

O2 P2

GROUP2={TEP-Bj} 102

B0 120 B1 121 B2 122 B3 123

4

950

O2 P2

OUTER_SIP=IP-TEP-A3
OUTER_DIP=IP-TEP-B0

Physical Network 205

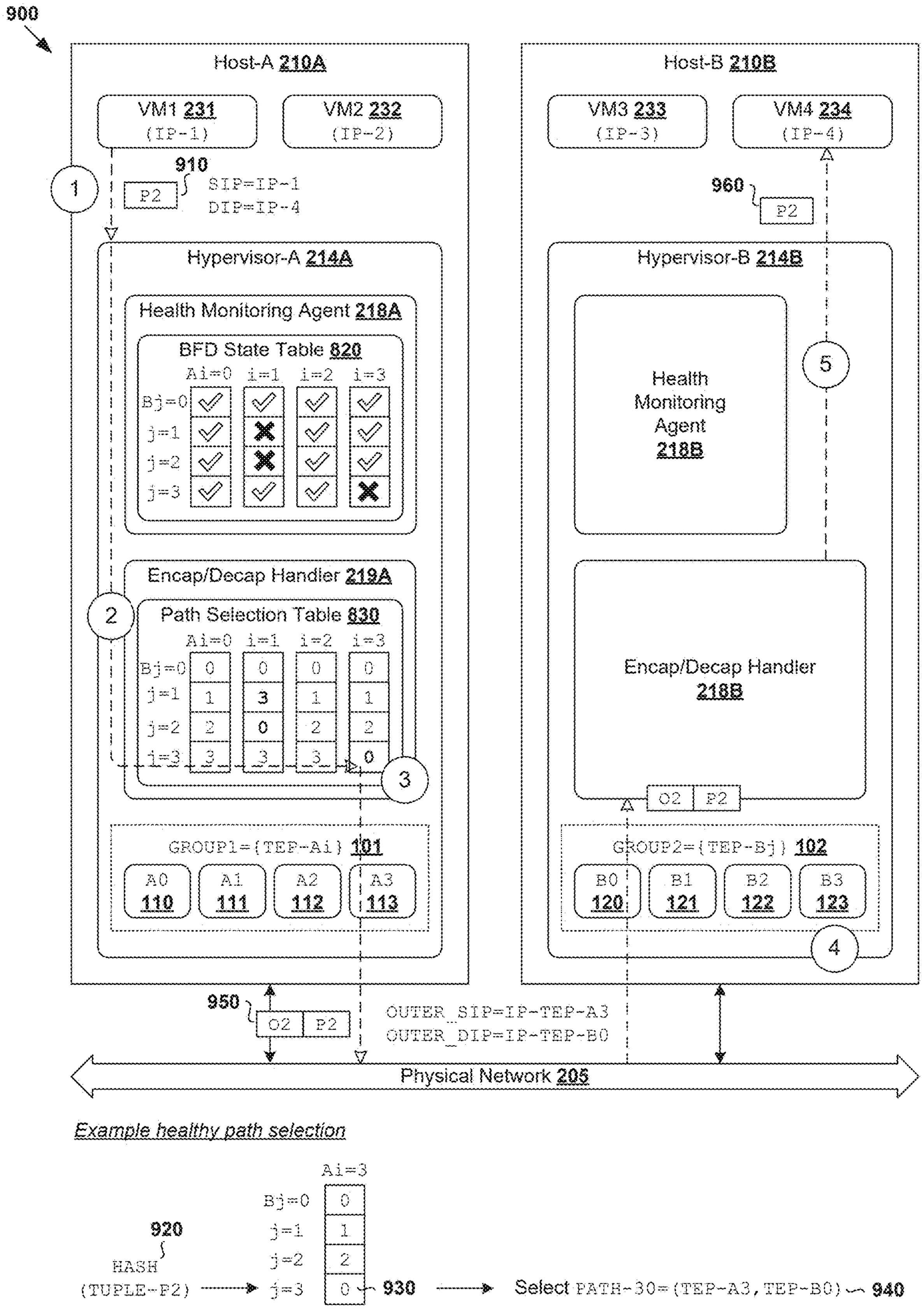

Path Selection Table 530
(see FIG. 5)

| | Ai=0 | i=1 | i=2 | i=3 |
|---|---|---|---|---|
| Bj=0 | 0 | 0 | 0 | 0 |
| j=1 | 1 | 1 | 1 | 1 |
| j=2 | 2 | 2 | 2 | 2 |
| j=3 | 3 | 3 | 3 | 3 |

128-member Indirection Table 1010

| | | | | | | | | |
|---|---|---|---|---|---|---|---|---|
| 0: | 0 | 0 | 0 | 0 | 0 | 0 | 0 | 0 |
| 8: | 1 | 1 | 1 | 1 | 1 | 1 | 1 | 1 |
| 16: | 2 | 2 | 2 | 2 | 2 | 2 | 2 | 2 |
| 24: | 3 | 3 | 3 | 3 | 3 | 3 | 3 | 3 |
| 32: | 0 | 0 | 0 | 0 | 0 | 0 | 0 | 0 |
| 40: | 1 | 1 | 1 | 1 | 1 | 1 | 1 | 1 |
| 48: | 2 | 2 | 2 | 2 | 2 | 2 | 2 | 2 |
| 56: | 3 | 3 | 3 | 3 | 3 | 3 | 3 | 3 |
| 64: | 0 | 0 | 0 | 0 | 0 | 0 | 0 | 0 |
| 72: | 1 | 1 | 1 | 1 | 1 | 1 | 1 | 1 |
| 80: | 2 | 2 | 2 | 2 | 2 | 2 | 2 | 2 |
| 88: | 3 | 3 | 3 | 3 | 3 | 3 | 3 | 3 |
| 96: | 0 | 0 | 0 | 0 | 0 | 0 | 0 | 0 |
| 104: | 1 | 1 | 1 | 1 | 1 | 1 | 1 | 1 |
| 112: | 2 | 2 | 2 | 2 | 2 | 2 | 2 | 2 |
| 120: | 3 | 3 | 3 | 3 | 3 | 3 | 3 | 3 |

Path Selection Table 630
(see FIG. 6)

| | Ai=0 | i=1 | i=2 | i=3 |
|---|---|---|---|---|
| Bj=0 | 0 | 0 | 0 | 0 |
| j=1 | 1 | **3** | 1 | 1 |
| j=2 | 2 | **0** | 2 | 2 |
| j=3 | 3 | 3 | 3 | **0** |

128-member Indirection Table 1020

| | | | | | | | | |
|---|---|---|---|---|---|---|---|---|
| 0: | 0 | 0 | 0 | 0 | 0 | 0 | 0 | 0 |
| 8: | 1 | **3** | 1 | 1 | 1 | **3** | 1 | 1 |
| 16: | 2 | **0** | 2 | 2 | 2 | **0** | 2 | 2 |
| 24: | 3 | 3 | 3 | **0** | 3 | 3 | 3 | **0** |
| 32: | 0 | 0 | 0 | 0 | 0 | 0 | 0 | 0 |
| 40: | 1 | **3** | 1 | 1 | 1 | **3** | 1 | 1 |
| 48: | 2 | **0** | 2 | 2 | 2 | **0** | 2 | 2 |
| 56: | 3 | 3 | 3 | **0** | 3 | 3 | 3 | **0** |
| 64: | 0 | 0 | 0 | 0 | 0 | 0 | 0 | 0 |
| 72: | 1 | **3** | 1 | 1 | 1 | **3** | 1 | 1 |
| 80: | 2 | **0** | 2 | 2 | 2 | **0** | 2 | 2 |
| 88: | 3 | 3 | 3 | **0** | 3 | 3 | 3 | **0** |
| 96: | 0 | 0 | 0 | 0 | 0 | 0 | 0 | 0 |
| 104: | 1 | **3** | 1 | 1 | 1 | **3** | 1 | 1 |
| 112: | 2 | **0** | 2 | 2 | 2 | **0** | 2 | 2 |
| 120: | 3 | 3 | 3 | **0** | 3 | 3 | 3 | **0** |

FIG. 10

HEALTH-AWARE OVERLAY PACKET FORWARDING BETWEEN TUNNEL ENDPOINT (TEP) GROUPS

BACKGROUND

Virtualization allows the abstraction and pooling of hardware resources to support virtual machines in a Software-Defined Networking (SDN) environment, such as a Software-Defined Data Center (SDDC). For example, through server virtualization, virtualized computing instances such as virtual machines (VMs) running different operating systems may be supported by the same server, computer, or other physical machine (e.g., referred to as a "host"). Each VM is generally provisioned with virtual resources to run an operating system and applications. The virtual resources may include central processing unit (CPU) resources, memory resources, storage resources, network resources, etc. In practice, a logical overlay tunnel may be established between a pair of tunnel endpoints (TEPs) to facilitate overlay traffic forwarding. However, overlay traffic may be susceptible to various performance issues that affect the quality of traffic flows in the SDN environment.

SUMMARY

According to examples of the present disclosure, health-aware overlay packet forwarding may be performed to select healthy paths between tunnel endpoint (TEP) groups, thereby improving performance. In one aspect, examples of the present disclosure may include a computer system, being a first computer system, to perform health-aware overlay packet forwarding in a software-defined networking (SDN) environment that includes the first computer system (e.g., host-A 210A in FIG. 1) and a second computer system (e.g., host-B 210B). In practice, the first computer system may include a processor and a non-transitory computer-readable storage medium that includes a set of instructions which, in response to execution by a processor of the first computer system, cause a processor to perform examples of the present disclosure.

In one example, the first computer system may monitor multiple paths between (a) a first tunnel endpoint (TEP) group supported by the first computer system and (b) a second TEP group supported by the second computer system (e.g., 101-102 in FIG. 1). The first computer system may update health information associated with the multiple paths to indicate that at least (a) a first path is healthy and (b) a second path is unhealthy. In response to detecting an egress packet that is associated with a packet flow, the first computer system may map the egress packet to the first path instead of the second path based on the health information. The first computer system may generate and forward an encapsulated packet along the first path towards the second computer system. The encapsulated packet may include the egress packet and an outer header that is addressed from a first TEP to a second TEP associated with the first path. See also blocks 310-350 in FIG. 3.

Other aspects of the present disclosure may include a method of health-aware overlay packet forwarding, as well as a non-transitory computer-readable storage medium that includes a set of instructions which, in response to execution by a processor of a computer system, cause a processor to perform aspect(s) of the method.

BRIEF DESCRIPTION OF DRAWINGS

FIG. 5 is a schematic diagram illustrating a first example of health monitoring and health information update in an SDN environment.

FIG. 7 is a schematic diagram illustrating an example health-aware overlay packet forwarding for a first packet flow using the example in FIG. 6.

FIG. 9 is a schematic diagram illustrating an example health-aware overlay packet forwarding for a second packet flow using the example in FIG. 8.

FIG. 10 is a schematic diagram illustrating an example detailed implementation of a path selection table.

DETAILED DESCRIPTION

Figure 1:
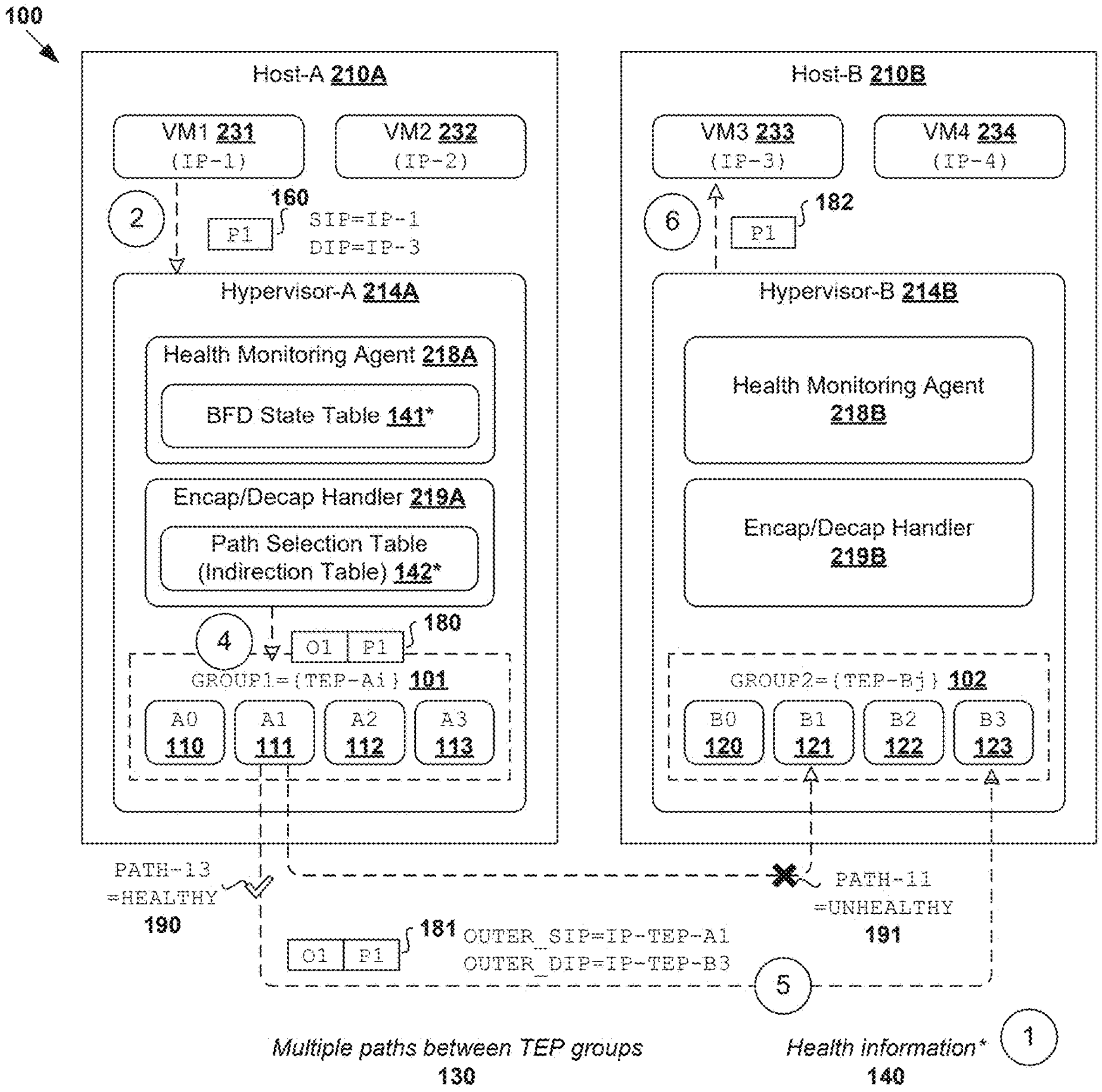
FIG. 1 is a schematic diagram illustrating an example software-defined networking (SDN) environment in which health-aware overlay packet forwarding may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, may be arranged, substituted, combined, and designed in a wide variety of different configurations, all of which are explicitly contemplated herein.

Although the terms "first" and "second" are used to describe various elements, these elements should not be limited by these terms. These terms are used to distinguish one element from another. For example, a first element may be referred to as a second element, and vice versa. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

Physical Implementation View

Figure 2:
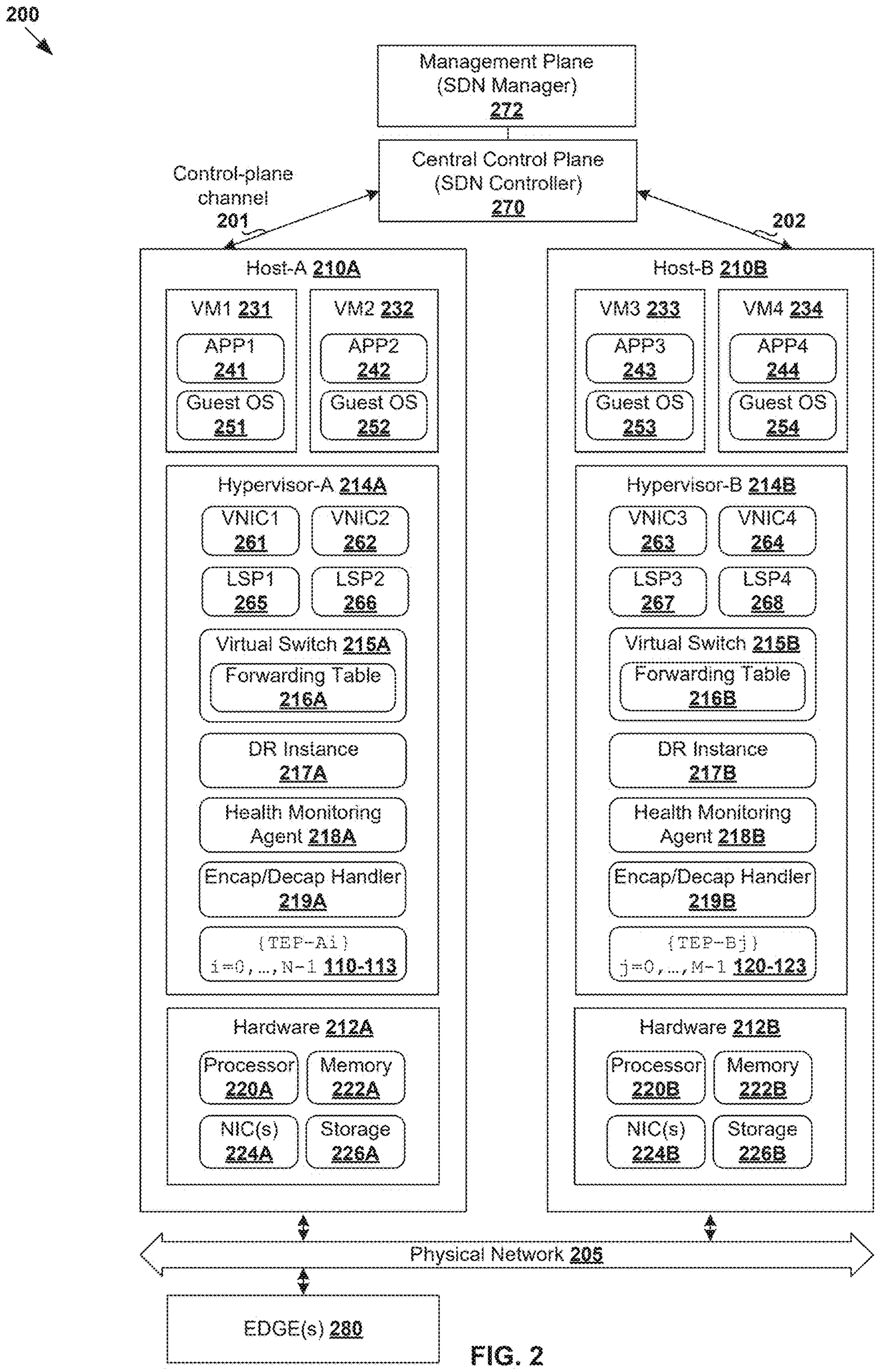
FIG. 2 is a schematic diagram illustrating an example physical implementation view of hosts in the SDN environment in FIG. 1.

FIG. 1 is a schematic diagram illustrating example software-defined networking (SDN) environment 100 in which health-aware overlay packet forwarding may be performed. FIG. 2 is a schematic diagram illustrating example physical implementation view 200 of hosts in SDN environment 100. Depending on the desired implementation, SDN environment 100 may include additional and/or alternative component(s) than that shown in FIGS. 1-2. In practice, SDN environment 100 may include any number of hosts (also known as "computer systems," "computing devices," "host computers", "host devices", "physical servers", "server systems", "transport nodes," etc.).

In the example in FIG. 1, SDN environment 100 may include host-A 210A ("first computer system") and host-B 210B ("second computer system") that are capable of communicating with each other via a physical network. Host 210A/210B may support one or more virtual machines (VMs), such as VM1 231 and VM2 232 on host-A 210A, and VM3 233 and VM4 234 on host-B 210B. Referring also to FIG. 2, host 210A/210B may include suitable hardware 212A/212B and virtualization software (e.g., hypervisor-A 214A, hypervisor-B 214B) to support various VMs. Hardware 212A/212B includes suitable physical components, such as processor(s) 220A/220B; memory 222A/222B; physical network interface controllers (PNICs) 224A/224B; and storage disk(s) 226A/226B, etc.

Hypervisor 214A/214B maintains a mapping between underlying hardware 212A/212B and virtual resources allocated to respective VMs. Virtual resources are allocated to respective VMs 231-234 to support a guest operating system (OS) and application(s); see 241-244, 251-254. For example, the virtual resources may include virtual CPU, guest physical memory, virtual disk, virtual network interface controller (VNIC), etc. Hardware resources may be emulated using virtual machine monitors (VMMs). For example in FIG. 2, VNICs 261-264 are virtual network adapters for VMs 231-234, respectively, and are emulated by corresponding VMMs (not shown) instantiated by their respective hypervisor at respective host-A 210A and host-B 210B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host OS without the need for a hypervisor or separate operating system, or implemented as an OS-level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers, etc. Hypervisors 214A-B may each implement any suitable virtualization technology, such as VMware ESX® or ESXi™ (available from VMware LLC), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" a network or Internet Protocol (IP) layer; and "layer-4" a transport layer (e.g., using Transmission Control Protocol (TCP), User Datagram Protocol (UDP), etc.), in the Open System Interconnection (OSI) model, although the concepts described herein may be used with other networking models.

SDN controller 270 and SDN manager 272 are example network management entities in SDN environment 100. One example of an SDN controller is the NSX controller component of VMware NSX® (available from VMware LLC) that operates on a central control plane. SDN controller 270 may be a member of a controller cluster (not shown for simplicity) that is configurable using SDN manager 272. Network management entity 270/272 may be implemented using physical machine(s), VM(s), or both. To send or receive control information, a local control plane (LCP) agent (not shown) on host 210A/210B may interact with SDN controller 270 via control-plane channel 201/202.

Through virtualization of networking services in SDN environment 100, logical networks (also referred to as overlay networks or logical overlay networks) may be provisioned, changed, stored, deleted and restored programmatically without having to reconfigure the underlying physical hardware architecture. Hypervisor 214A/214B implements virtual switch 215A/215B and logical distributed router (DR) instance 217A/217B to handle egress packets from, and ingress packets to, VMs 231-234. In SDN environment 100, logical switches and logical DRs may be implemented in a distributed manner and can span multiple hosts.

For example, a logical switch (LS) may be deployed to provide logical layer-2 connectivity (i.e., an overlay network) to VMs 231-234. A logical switch may be implemented collectively by virtual switches 215A-B and represented internally using forwarding tables 216A-B at respective virtual switches 215A-B. Forwarding tables 216A-B may each include entries that collectively implement the respective logical switches. Further, logical DRs that provide logical layer-3 connectivity may be implemented collectively by DR instances 217A-B and represented internally using routing tables (not shown) at respective DR instances 217A-B. Each routing table may include entries that collectively implement the respective logical DRs.

Packets may be received from, or sent to, each VM via an associated logical port. For example, logical switch ports 265-268 (labelled "LSP1" to "LSP4") are associated with respective VMs 231-234. Here, the term "logical port" or "logical switch port" may refer generally to a port on a logical switch to which a virtualized computing instance is connected. A "logical switch" may refer generally to an SDN construct that is collectively implemented by virtual switches 215A-B, whereas a "virtual switch" may refer generally to a software switch or software implementation of a physical switch. In practice, there is usually a one-to-one mapping between a logical port on a logical switch and a virtual port on virtual switch 215A/215B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

A logical overlay network may be formed using any suitable tunneling protocol, such as Virtual extensible Local Area Network (VXLAN), Stateless Transport Tunneling (STT), Generic Network Virtualization Encapsulation (GENEVE), Generic Routing Encapsulation (GRE), etc. For example, VXLAN is a layer-2 overlay scheme on a layer-3 network that uses tunnel encapsulation to extend layer-2 segments across multiple hosts which may reside on different layer 2 physical networks. Hypervisor 214A/214B may implement multiple TEPs (e.g., see 110-113, 120-123) to encapsulate packets with an outer header (also known as a tunnel header) identifying the relevant logical overlay network (e.g., VNI). Hosts 210A-B may maintain data-plane connectivity with each other via physical network 205 to facilitate east-west communication among VMs 231-234.

Hosts 210A-B may also maintain data-plane connectivity with EDGE node(s) 280 via physical network 205 to facilitate north-south traffic forwarding, such as between a VM (e.g., VM1 231) and a remote destination located at a different geographical site. In practice, EDGE node 280 may be an entity that is implemented using one or more VMs and/or physical machines (known as "bare metal machines") and capable of performing functionalities of a switch, router, bridge, gateway, edge appliance, etc. EDGE node 280 may implement a logical service router (SR) to provide networking services, such as gateway service, domain name system (DNS) forwarding, IP address assignment using dynamic host configuration protocol (DHCP), source network address translation (SNAT), destination NAT (DNAT), deep packet inspection, etc. When acting as a gateway, EDGE node 280 may be considered to be an exit point to an external network.

TEP Groups

In practice, networking virtualization makes it possible to programmatically create, provision, and manage virtual networks in software, using underlying physical network 205 as a simple packet forwarding backplane. To implement networking policies and enforce isolation in SDN environment 100, overlay networking techniques may be implemented to provide an abstraction layer between the physical network infrastructure (i.e., underlay) and virtual network services. Through this abstraction, VMs 231-234 may communicate in a virtual address space that is isolated from the physical network infrastructure. An operator may configure an overlay network in software more easily, while paying minimal attention to the physical topology.

To facilitate overlay packet forwarding, multiple tunnel endpoints (TEPs) may be configured on hosts 210A-B. For example in FIG. 1, multiple (N) TEPs that are each denoted as TEP-Ai (see 110-113) may be configured on host-A 210A, where i=0, . . . , N−1. Similarly, multiple (M) TEPs that are each denoted as TEP-Bj (see 120-123) may be configured on host-B 210B, where j=0, . . . , M−1. Each TEP may be assigned with an underlay network address, such as IP-Ai for TEP-Ai and IP-Bj for TEP-Bj. As used herein, the term "tunnel endpoint" or TEP may refer generally to any suitable point or interface (e.g., physical or software-implemented) that originates or terminates a tunnel. The term "TEP" may be used interchangeably with "virtual tunnel endpoint" or VTEP. The term "overlay packet" may refer generally to an encapsulated packet for transmission over a logical overlay tunnel or path between a pair of TEPs.

In practice, a logical overlay tunnel may be established between any pair of TEPs, each tunnel representing a network path from one host to another. For example, when VM1 231 on host-A 210A sends a packet that is destined for VM3 233 on host-B 210B, hypervisor-A 214A may generate an encapsulated packet by encapsulating the (inner) packet with an outer header. Here, the outer header may be configured to identify (a) source TEP-Ai on host-A 210A and (b) destination TEP-Bj on host-B 210B. The encapsulated packet may then be forwarded from the source TEP towards the destination TEP. At destination host-B 210B, the outer header may be decapsulated (i.e., removed) before the inner packet is sent to destination VM3 233.

Conventionally, when a particular VM is installed on a hypervisor, each VNIC associated with the VM is tied or assigned to a single TEP for sending and receiving traffic, such as between VNIC1 261 of VM1 231 and TEP-A0 110 on host-A 210A. The TEP is in turn mapped to a particular PNIC. Due to this configuration, all flows from that VM will be sent via its assigned TEP and PNIC. When the PNIC fails, however, a link down event will be triggered to cause a workload failover. This involves remapping the VNIC and associated VM to healthy PNIC(s) such that all packet flows from the associated VM may be redirected. The update is then broadcasted to the control plane and remote hypervisors to ensure correct encapsulation for subsequent traffic. An alarm may also be triggered to alert an operator or network administrator.

As such, according to conventional approaches, a VNIC's TEP assignment is largely constant for its lifetime, changing only in response to specific link down events. In practice, workload failover may be undesirable for various reasons. This is because of relatively high overhead to facilitate a workload failover, considering the cost of flooding the network to update mappings, the control-plane churn, and relevant data structure modifications required on each hypervisor. Also, this approach is coarse-grained in that either all workloads (and thus all overlay packet flows) associated with a failed PNIC are failed over, or no recovery would occur.

Health-Aware Overlay Packet Forwarding

According to examples of the present disclosure, health-aware overlay packet forwarding may be implemented to improve overlay network availability and performance in SDN environment 100. Instead of mapping each VNIC to a single TEP (i.e., single uplink), the VNIC may be mapped to multiple TEPs that form a TEP group. This way, the VNIC is able to send and receive traffic through multiple TEPs to facilitate load balancing on a per-flow basis. Further, examples of the present disclosure may be implemented to support TEP high availability (HA) over TEP groups. In particular, health information associated with multiple paths between TEP groups may be updated dynamically. This way, overlay traffic flows may be steered towards healthy paths, thereby providing per-flow failover instead of workload failover.

For example in FIG. 1, a first TEP group (see 101) assigned with label="GROUP1" may be configured on host-A 210A. GROUP1 101 may include multiple (N) TEPs that are denoted as {TEP-Ai}, where i=0, . . . , N−1. On host-B 210B, a second TEP group (see 102) assigned with label="GROUP2" may be configured. GROUP2 102 may include multiple (M) TEPs that are denoted as {TEP-Bj}, where j=0, . . . , M−1. Using N=4, GROUP1 101 may include TEP-A0, TEP-A1, TEP-A2 and TEP-A3 (see 110-113). Using M=4, GROUP2 102 may include TEP-B0, TEP-B1, TEP-B2 and TEP-B3 (see 120-123). As used herein, the term "TEP group" may refer to multiple TEPs that are assigned to a group. TEP groups 101-102 may be configured to, inter alia, decouple the strict binding between overlay addresses and underlay TEPs, thereby leading to a fairer bandwidth allocation and higher uplink utilization on a server host.

Throughout the present disclosure, each path between a pair of TEPs may be denoted as PATH-ij=(TEP-Ai, TEP-Bj), where TEP-Ai is from GROUP1 101 and TEP-Bj is from GROUP2 102. The term "path" may refer generally to a route between a pair of TEPs. Using N=M=4, for example, N×M=16 network paths are shown in FIG. 1, including PATH-00=(TEP-A0, TEP-B0), PATH-01=(TEP-A0, TEP-B1), PATH-02=(TEP-A0, TEP-B2), PATH-03=(TEP-A0, TEP-B3), PATH-10=(TEP-A1, TEP-B0), PATH-11=(TEP-A1, TEP-B1), and so on. See 130 in FIG. 1.

Some examples will be described using FIG. 3, which is a flowchart of example process 300 for a first computer system to perform health-aware overlay packet forwarding. Example process 300 may include one or more operations, functions, or actions illustrated by one or more blocks, such as 310 to 350. Depending on the desired implementation, various blocks may be combined into fewer blocks, divided into additional blocks, and/or eliminated. In practice, the "first computer system" may include any suitable hardware and/or software component(s) to implement examples of the present disclosure, such as health monitoring agent 218A/218B and encapsulation/decapsulation handler 219A/219B (also known as overlay layer-2 (L2) module).

In the following, various examples will be explained using host-A 210A as a "first computer system," VM1 231 as a "first virtualized computing instance," host-B 210B as a "second computer system," and VM3 233 as a "second virtualized computing instance." An example "first path" will be described using PATH-13 between "first TEP"=TEP-A1 111 and "second TEP"=TEP-B3 123. An example unhealthy "second path" will be described using PATH-11 between "first TEP"=TEP-A1 111 and "third TEP"=TEP-B1 121.

Figure 3:
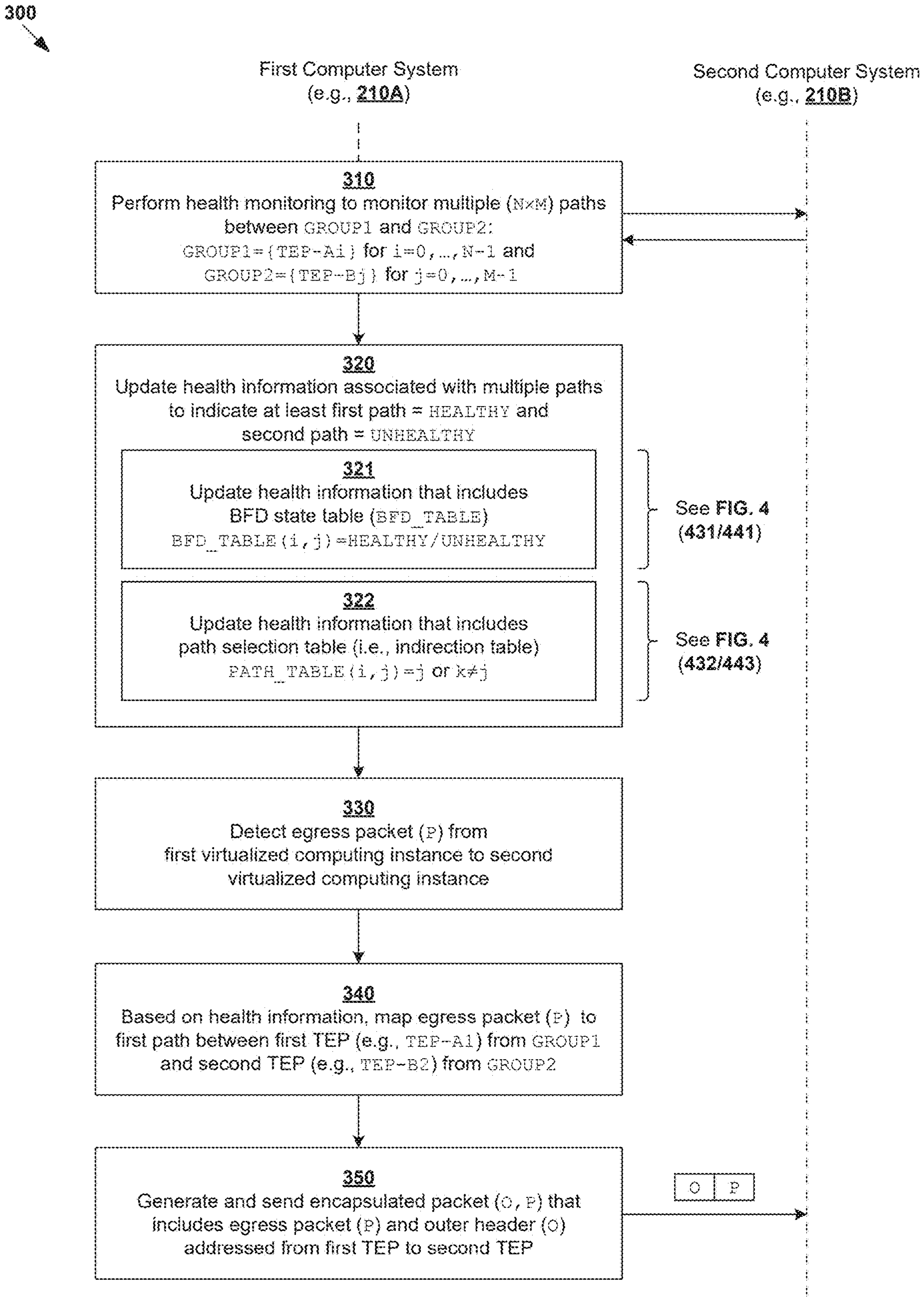
FIG. 3 is a flowchart of an example process for a first computer system to perform health-aware overlay packet forwarding.

At 310 in FIG. 3, host-A 210A may perform health monitoring to monitor multiple paths between (a) first TEP group=GROUP1 101 supported by host-A 210A and (b) second TEP group=GROUP2 102 supported by host-B 210B. Any suitable health monitoring approach may be used, such as by establishing multiple (N×M) health monitoring sessions to monitor respective multiple (N× M) paths between TEP groups 101-102. See example paths at 130 in FIG. 1.

At 320 in FIG. 3, host-A 210A may update health information associated with the multiple paths to indicate that at least (a) a first path is healthy and (b) a second path is unhealthy. In the example in FIG. 1, health information 140 may indicate that first path=PATH-13 (i.e., between TEP-A1 and TEP-B3) is healthy while second path=PATH-11 (i.e., between TEP-A1 and TEP-B1) is unhealthy. Note that the term "first path" or "second path" may be any of multiple paths 130. Sec 141-142 in FIG. 1.

At 330 in FIG. 3, host-A 210A may detect an egress packet (P1) that originates from VM1 231 and is destined for VM3 233 supported by host-B 210B. In response, at 340, host-A 210A may map the egress packet to the first path=PATH-13 (i.e., healthy) instead of second path=PATH-11 (i.e., unhealthy) based on health information 140. The mapping may be performed using any suitable approach, such as based on content of the egress packet, particularly flow tuple information from a header of the egress packet. See 160-170 in FIG. 1.

At 350 in FIG. 3, host-A 210A may generate and forward an encapsulated packet along the first path towards host-B 210B. For example, in FIG. 1, the encapsulated packet may include the egress packet (P1) and an outer header (O1) that is addressed from first TEP=TEP-A1 (see 111) to second TEP=TEP-B3 (see 123), thereby steering the packet from unhealthy PATH-11 towards healthy PATH-13. At host-B 210B, decapsulation may be performed by hypervisor-B 214B to remove the outer header before the inner packet is forwarded towards VM3 233. See 180-182 and 190-191 in FIG. 1.

As used herein, the term "health information" may refer generally to information stored in any suitable data structure (e.g., table(s)) to indicate an operational state associated with a path (e.g., healthy or unhealthy, UP or DOWN, etc.). The term "unhealthy" may refer generally to a path that is experiencing outage or performance degradation. In contrast, the term "healthy" may refer generally to a path refer to a path that is not experiencing outage or performance degradation. In one example, a path may be considered to be unhealthy when it is detected to be DOWN (e.g., due to outage), but healthy otherwise. In another example, a path may be considered to be unhealthy in response to detection of performance degradation associated with the path, such as by determining whether metric information associated with the path satisfies predetermined threshold(s). Any suitable metric information may be used, such as packet loss, throughput, latency, retransmission rate, etc. The metric information may be collected over any suitable period of time. The term "predetermined threshold" may refer generally to any suitable threshold that is configured programmatically (e.g., using software or artificial intelligence (AI)) or manually (e.g., by a network administrator). In practice, performance degradation may be caused by an outage or brownout at an intermediate network device located on a path, such as top-of-rack (ToR) switch, spine switch, etc. It has been observed that underlay disruptions lead not only to application degradation, but also to a break in the service(s) provided.

Examples of the present disclosure may be implemented to provide a finer-grained, automatic availability solution that is capable of switching overlay traffic on a per-path basis according to physical network conditions. In practice, examples of the present disclosure may be implemented to reduce the number of service interruptions. Given the rising availability demands of modern applications, underlay network failures often result in unacceptable outages and, in some cases, service level agreement (SLA) violations for SDN users. Any reduction in service interruptions may lead to improved packet forwarding performance as well as improved SLA compliance. SDN users would greatly benefit from the capability to automatically and rapidly recovery from underlay outages, brownouts and service degradations. Examples of the present disclosure should be contrasted against conventional approaches that necessitate failing-over workloads between TEPs. Such approaches may require expensive reconfiguration, rely only on local visibility (e.g., explicit link down), require manual intervention of an operator, and/or are coarse-grained (i.e., at the scale of workloads, rather than flows).

Various examples will be discussed using FIGS. 4-10 below. Although explained with reference to east-west traffic between hosts 210A-B, it should be understood that examples of the present disclosure may be implemented for north-south traffic between first computer system=host 210A/B and second computer system=EDGE node 280 capable of implementing multiple TEPs that are assigned to a TEP group (not shown for simplicity).

Example Health Monitoring

Figure 4:
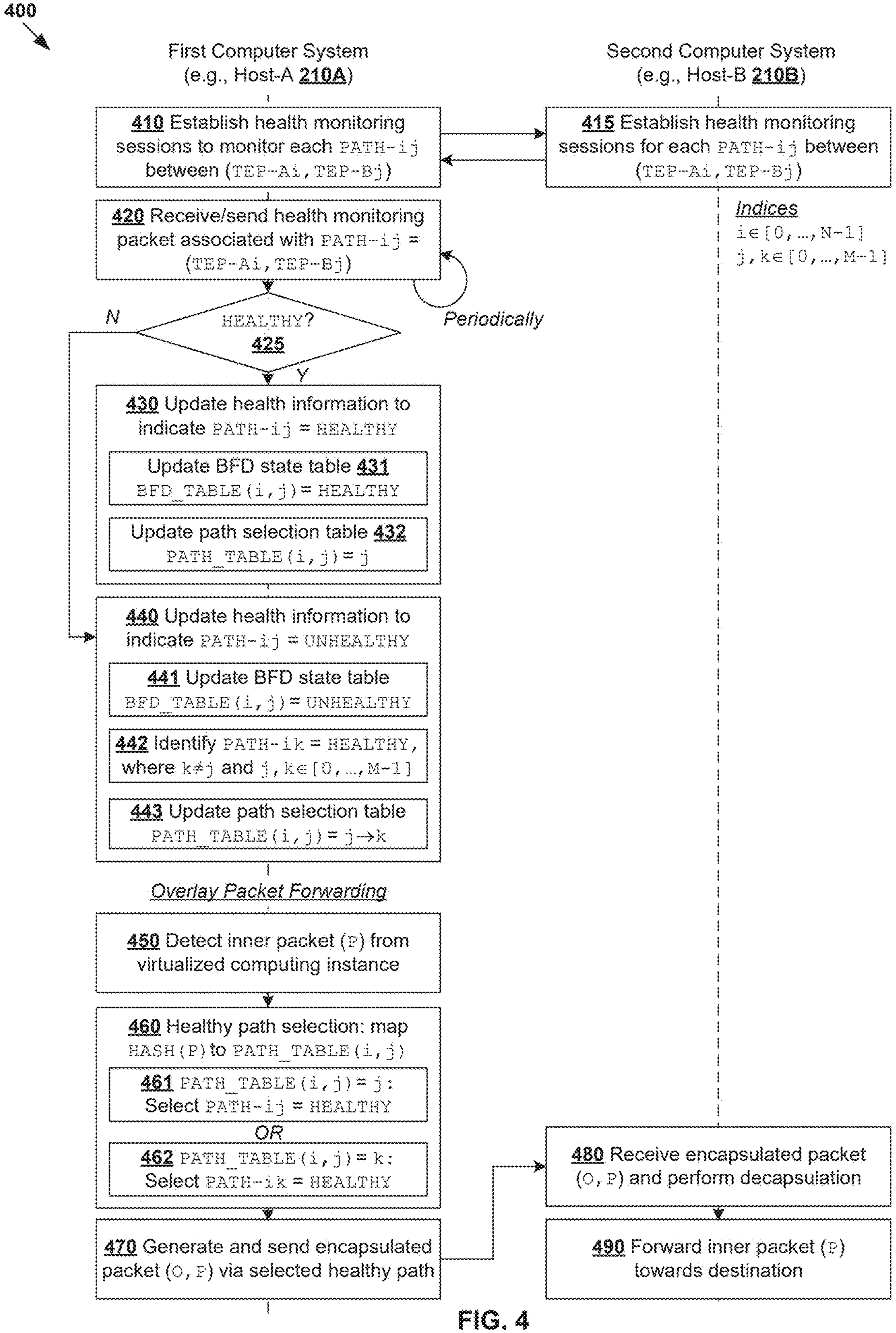
FIG. 4 is a flowchart of an example detailed process for a first computer system to perform health-aware overlay packet forwarding.

FIG. 4 is a flowchart of example detailed process 400 for a first computer system to perform health-aware overlay packet forwarding in SDN environment 100. Example process 400 may include one or more operations, functions, or actions illustrated by one or more blocks, such as 410 to 490. Depending on the desired implementation, various blocks may be combined into fewer blocks, divided into additional blocks, and/or eliminated. Example process 400 may be performed by host 210A/210B, such as using health monitoring agent 218A/218B and encapsulation/decapsulation handler 219A/219B, etc. In the following, a first example will be described using FIG. 5, which is a schematic diagram illustrating first example 500 of health monitoring and health information update in SDN environment 100.

(a) Health Monitoring Sessions

At 510 in FIG. 5, host-A 210A may perform health monitoring to monitor multiple (N×M) paths between GROUP1 101 and GROUP2 102. For example, host-A 210A and host-B 210B may establish multiple (N×M) health monitoring sessions to monitor the respective multiple paths. In practice, any fault detection or continuity check protocol suitable for health monitoring purposes. One example is Bidirectional Forwarding Detection (BFD) protocol that is defined in the Internet Engineering Task Force (IETF) Request for Comments (RFC) 5880, which is incorporated herein by reference.

Using BFD as an example, a health monitoring session in the form of a BFD session may be established between each (TEP-Ai,TEP-Bj) pair to detect any failure or performance degradation in the underlay path between them. For example, an outage may be caused by a brownout at a ToR switch connecting a particular (TEP-Ai,TEP-Bj) pair. Using an asynchronous mode, for example, BFD packets may be generated and sent over a BFD session periodically. Any alternative protocol or health monitoring approach may be used. See blocks 410-415 in FIG. 4.

(b) BFD State Information

At 520 in FIG. 5, in response to detecting a BFD packet over a BFD session associated with a particular PATH-ij=(TEP-Ai,TEP-Bj), host-A 210A may update health information in the form of a BFD state table. As used herein, the term "BFD state table" may refer generally to a data structure (e.g., table) storing any suitable information indicating a health status associated with each of multiple paths in SDN environment 100. In this example, BFD state table 520 may include an array of N×M entries or elements associated with respective multiple paths between TEP groups 101-102. In BFD state table 520, each entry may be associated with a unique pair of indices (i, j) to represent a corresponding PATH-ij. Here, first index=i∈{0, . . . , N−1} indicates a particular TEP-Ai on host-A 210A. Second index=j∈{0, . . . , M−1} indicates a particular TEP-Bj on host-B 210B.

In practice, the BFD packet may indicate a state associated with PATH-ij, such as BFD session up or normal (i.e., path=healthy) and BFD session down (i.e., path=unhealthy). In the example in FIG. 5, all network paths are associated with state=healthy, which is indicated using a "tick" symbol (as shown), 1=healthy or UP, etc. Depending on the desired implementation, BFD state table 520 may be updated only when a state transition from healthy to unhealthy (or vice versa) is detected. Note that any suitable data structure(s) may be used to store the BFD state information (i.e., not necessarily a table). See also blocks 425, 430-431 and 440-441 in FIG. 4.

(b) Path Selection Table

At 530 in FIG. 5, based on an update to BFD state table 520, host-A 210A may also update health information that includes path selection table 530 (also known as an indirection table). As used herein, the term "path selection table" may refer generally to a data structure (e.g., table) for storing any suitable information for identifying and selecting healthy path(s) in SDN environment 100. By updating path selection table 530 dynamically based on any BFD state change(s), path selection table 530 may be used to identify and select healthy paths and remote TEPs. Based on path selection table 530, health-aware overlay traffic forwarding may be implemented to steer overlay traffic towards healthy paths instead of unhealthy paths. Note that any alternative data structure (i.e., not necessarily a table) may be used in practice.

Similar to BFD state table 520, path selection table 530 may include an array of N×M entries associated with respective multiple paths between TEP groups 101-102. Each entry may be associated with a unique pair of indices (i, j) to represent a corresponding PATH-ij. Here, first index=i∈{0, . . . , N−1} identifies a particular TEP-Ai on host-A 210A. Second index=j∈{0, . . . , M−1} identifies a particular TEP-Bj on host-B 210B. In response to detecting PATH-ij=healthy, a table entry associated with indices (i, j) identifying (TEP-Ai, TEP-Bj) may be configured to store index=j. Sec corresponding blocks 425 (yes), 430 and 432 in FIG. 4.

Otherwise, in response to detecting that PATH-ij=unhealthy (e.g., a state transition from healthy to unhealthy), the table entry associated with indices (i, j) may be configured to store an alternative index=k≠j, where j, k∈{0, . . . , M−1}. This way, the updated entry may identify healthy PATH-ik instead of unhealthy PATH-ij, thereby replacing PATH-ij with PATH-ik. This also has the effect of replacing remote TEP-Bj with TEP-Bk. See corresponding blocks 425 (no), 440 and 442-443.

(c) State=Healthy

Some examples will be explained with reference to table entries associated with local TEP-A1 (i=1) in FIG. 5. At 531, in response to detecting that PATH-10=healthy, a first entry (i=1, j=0) identifying (TEP-A1, TEP-B0) may be configured to store index j=0 associated with TEP-B0. At 532, in response to detecting that PATH-11=healthy, a second entry (i=1, j=1) identifying (TEP-A1, TEP-B1) may be configured to store index j=1 associated with TEP-B1. At 533, in response to detecting that PATH-12=healthy, a third entry (i=1,j=2) identifying (TEP-A1, TEP-B2) may be configured to store index j=2 associated with TEP-B2. At 534, in response to detecting that PATH-13=healthy, a fourth entry (i=1, j=3) identifying (TEP-A1, TEP-B3) may be configured to store index j=3 associated with TEP-B3.

At 540 in FIG. 5, during packet forwarding, an egress packet may be mapped to a pair of TEPs based on a hash value. For example, the hash value may be calculated based on content of the egress packet, such as tuple information that is extractable from the packet's header information. Example tuple information may include source address information (e.g., source IP address), destination address information (e.g., destination IP address), port number information (e.g., source and destination port numbers), protocol information (e.g., TCP), etc.

At 541 in FIG. 5, in response to mapping the hash value to the first entry (i=1, j=0) in path selection table 530, remote TEP-B0 120 and PATH-10 may be selected. At 542, if mapped to the second entry (i=1, j=1), TEP-B1 121 and PATH-11 may be selected. At 543, if mapped to the third entry (i=1, j=2), TEP-B2 122 and PATH-12 may be selected. At 544, if mapped to the fourth entry (i=1, j=3), TEP-B3 123 and PATH-13 may be selected. See also corresponding blocks 450 and 460-461 in FIG. 4.

Example State Transitions

According to examples of the present disclosure, path selection table 530 in FIG. 5 may be updated dynamically to incorporate BFD state information associated with multiple paths 130 into the path selection process. In response to detecting that a state transition from healthy to unhealthy, path selection table 530 may be updated to replace or substitute an unhealthy path with a healthy path. Some examples will be explained using FIG. 6, which is a schematic diagram illustrating second example 600 of health monitoring and health information update in SDN environment 100.

(a) Healthy to Unhealthy

Figure 6:
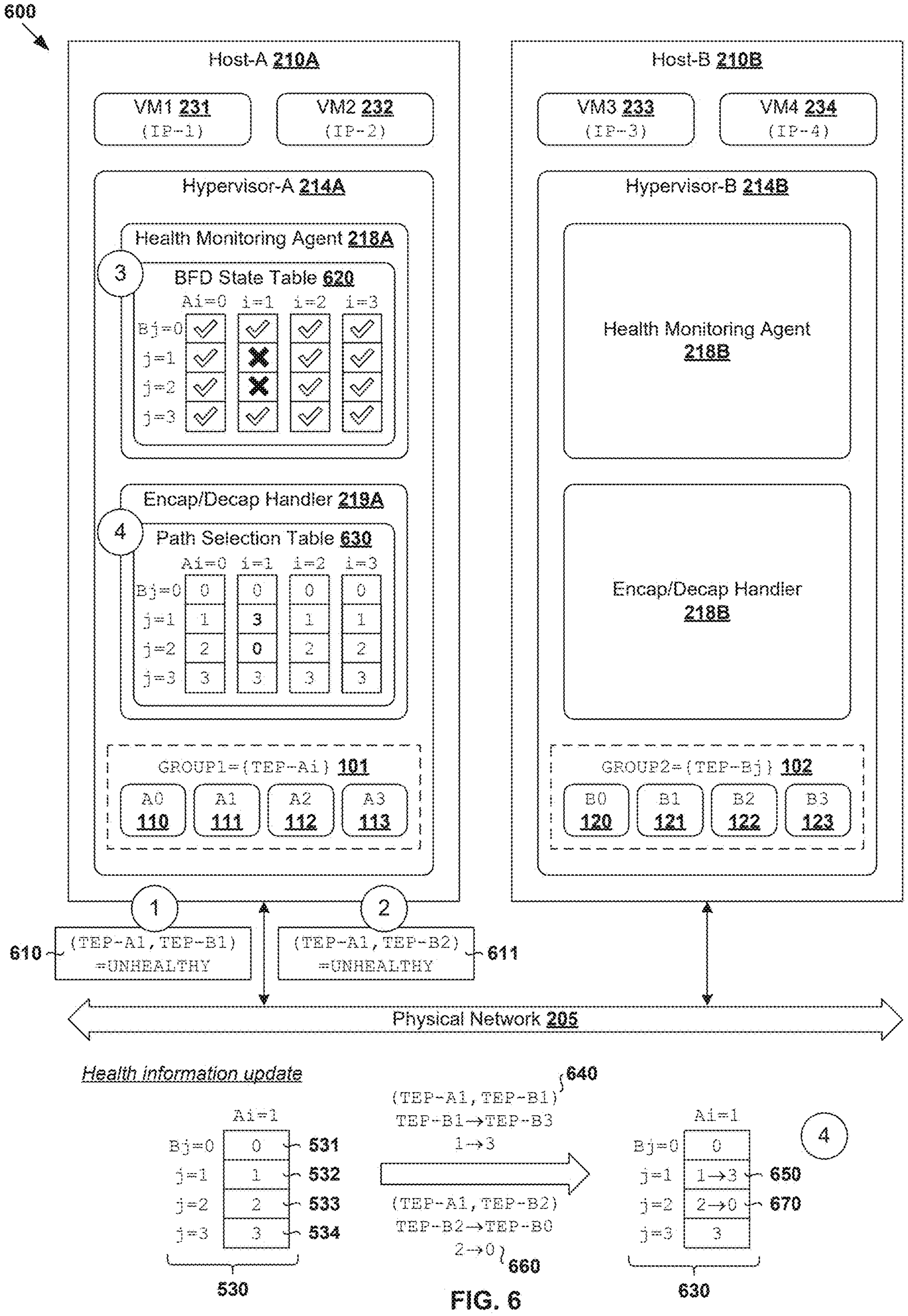
FIG. 6 is a schematic diagram illustrating a second example of health monitoring and health information update in an SDN environment.

Referring to FIG. 6, at 610, based on a first BFD packet, host-A 210A may detect a state transition from healthy to unhealthy for PATH-11 between TEP-A1 and TEP-B1. Further, at 611, based on a second BFD packet, host-A 210A may detect a state transition from healthy to unhealthy for PATH-12 between TEP-A1 and TEP-B2.

At 620 in FIG. 6, in response to detecting the state transitions, host-A 210A may update BFD state table 520 in FIG. 5. For example, a first entry (i=1, j=1) identifying (TEP-A1, TEP-B1) in updated BFD state table 620 indicates that PATH-11=unhealthy. A second entry (i=1, j=2) identifying (TEP-A1, TEP-B1) indicates that PATH-12=unhealthy. State=unhealthy may be indicated using any suitable approach, such as a "cross" symbol (as shown), 0 or DOWN, etc. Note that PATH-10 and PATH-13 associated with the same local TEP-A1 remain healthy.

At 630 in FIG. 6, in response to detecting the state transitions, host-A 210A may generate updated path selection table 630 by replacing an unhealthy path with a healthy path. At 640-650, one entry associated with (i=1,j=1) may be updated to replace j=1 with k=3 to identify healthy PATH-ik=PATH-13 instead of unhealthy PATH-ij=PATH-11. During overlay packet forwarding, if a hash value is mapped to the updated entry, healthy PATH-13 may be selected based on k=3. This has the effect of substituting remote TEP=TEP-B1 (i.e., unhealthy path) with TEP-B3 (i.e., healthy path).

At 660-670 in FIG. 6, another entry associated with (i=1, j=2) may be updated to replace j=2 with k=0 to identify healthy PATH-ik=PATH-10 instead of unhealthy PATH-ij=PATH-12. This way, if a hash value is mapped to the updated entry, healthy PATH-10 may be selected based on k=0. This has the effect of substituting remote TEP=TEP-B2 122 (i.e., unhealthy path) with TEP-B0 120 (i.e., healthy path) to steer new packet flows from an unhealthy path to a healthy path. See corresponding blocks 425 (no), 440, 442-443 in FIG. 4.

Examples of the present disclosure may be implemented to provide overlay networks with a "self-healing" capability at a per-flow granularity. When a datapath lookup occurs, only indices identifying healthy paths and remote TEPs may be selected from path selection table 630. By removing indices associated with unhealthy paths, path selection table 630 prevents (or at least reduces the likelihood of) an unhealthy path from being selected when a healthy one exists. Path selection table 630 may be maintained at a switch level and updated at runtime for each TEP group configured on host-A 210A. Since BFD sessions are maintained per local-remote TEP pair, each local TEP-Ai on host-A 210A may maintain its own, separate array (1×M) to identify healthy remote TEP-Bj. It should be understood that path selection table 630 may be updated dynamically to facilitate selection of healthy paths. For example, if all paths from a particular local TEP (e.g., TEP-A1) are unhealthy, path selection table 630 may be updated such that unhealthy paths are substituted with healthy paths from another local TEP (e.g., TEP-A0). In another example, a default path may be selected, such as PATH-00 (i.e., choosing the first member of each TEP group).

(b) Unhealthy to Healthy

Once a state transition from unhealthy to healthy (e.g., BFD session returns to UP) is detected for PATH-ij, BFD state table 620 and path selection table 630 may be updated to indicate that PATH-ij=healthy, thereby replacing PATH-ik with PATH-ij to support load balancing among all healthy TEPs. For PATH-11, this may involve updating entry 650 in path selection table 630 to reinsert or restore index j, i.e., replace k=3 with j=1 to identify (TEP-A1, TEP-B1) once again. Similarly, for PATH-12, entry 660 in path selection table 630 may be updated replace k=0 with j=2, thereby replacing PATH-10 with PATH-12. See corresponding blocks 425 (yes) and 430-432 in FIG. 4.

Health-Aware Overlay Packet Forwarding for First Packet Flow

FIG. 7 is a schematic diagram illustrating example health-aware overlay packet forwarding 700 in SDN environment 100 for a first packet flow using the example in FIG. 6. The following notations will be used below: SIP=source IP address, DIP=destination IP address, OUTER_SIP=outer source TEP IP address in an outer header, OUTER_DIP=outer destination TEP IP address in the outer header, etc.

At 710 in FIG. 7, host-A 210A may detect an egress packet (P1) belonging to a first packet flow from VM1 231. P1 710 may specify (SIP=IP-1, DIP=IP-3) associated with respective source VM1 231 on host-A 210A and destination VM3 233 on host-B 210B. See also block 450 in FIG. 4.

At 720 in FIG. 7, host-A 210A may calculate a hash value based on P1 710 and map the hash value to an entry in path selection table 630. Here, the hash value may be used to index into a particular entry in path selection table 630, i.e., the hash value is for locating or referencing that entry. The hash value may be calculated based on flow tuple information extracted from its header, such as SIP=IP-1, DIP=IP-3, source and destination port numbers, protocol, etc. For example, at 730, the hash value may then be mapped to a first entry associated with (i=1, j=1) in path selection table 630. This way, host-A 210A may "select" both source and destination TEP on a per-flow basis, thereby providing more flexibility to steer packet flows towards healthy paths.

At 740 in FIG. 7, based on k=3 stored in the first entry, host-A 210A may select PATH-ik=PATH-13. See also 460-462 in FIG. 4. In practice, the mapping process (i.e., slow-path processing) may be performed for a new packet flow to which P1 710 belongs. A cache maintained by handler 219A may then be updated to store mapping information that associates (a) the flow (e.g., tuple information of P1 710) with (b) PATH-13. Based on the cached mapping information, subsequent packets belonging to the same flow may be mapped to PATH-13 directly (i.e., fast-path processing). The cache is not shown for simplicity.

At 750 in FIG. 7, host-A 210A may generate and forward an encapsulated packet that includes P1 710 and an outer header (O1) that is addressed from (a) OUTER_SIP=IP-TEP-A1 associated with TEP-A1 111 to (b) OUTER_DIP=IP-TEP-B3 associated with TEP-B3 123. Depending on the desired implementation, the outer header (O1) may also include source TEP group label="GROUP1" and/or destination TEP group label="GROUP2." Next, encapsulated packet 750 may be forwarded from TEP-A1 111 towards TEP-B3 123 via physical network 205 (i.e., underlay network). See block 470 in FIG. 4.

At 760-770 in FIG. 7, in response to receiving the encapsulated packet via TEP-B3 123, host-B 210B may perform decapsulation to remove the outer header (O1) before forwarding the inner packet (P1) towards destination VM3 233. See corresponding 480-490 in FIG. 4. In practice, any suitable tunneling protocol or encapsulation mechanism may be used for overlay networking between hosts 210A-B, such as VXLAN, GENEVE, GRE, STT, etc. The encapsulation mechanisms are generally connectionless. Using GENENE as an example, various implementation details may be found in a draft document entitled "GENEVE: Generic Network Virtualization Encapsulation" (draft-ietf-nvo3-geneve-16) published by Internet Engineering Task Force (IETF). The document is incorporated herein by reference.

To connect to physical network 205, each TEP-Ai may be associated with an uplink. Here, an "uplink" may represent a logical construct for a connection to a network. From the perspective of host 210A/B, the term "uplink" may refer generally to a network connection from host 210A/B via a PNIC to a physical network device (e.g., top-of-rack switch, spine switch, router) in physical network 105. The term "downlink," on the other hand, may refer to a connection from the physical network device to host 210A/B. In practice, the mapping between an uplink and a PNIC may be one-to-one (i.e., one PNIC per uplink). Alternatively, a NIC teaming policy may be implemented to map multiple PNICs to one uplink. The term "NIC teaming" may refer to the grouping of multiple PNICs into one logical NIC.

Health-Aware Overlay Packet Forwarding for Second Packet Flow

Figure 8:
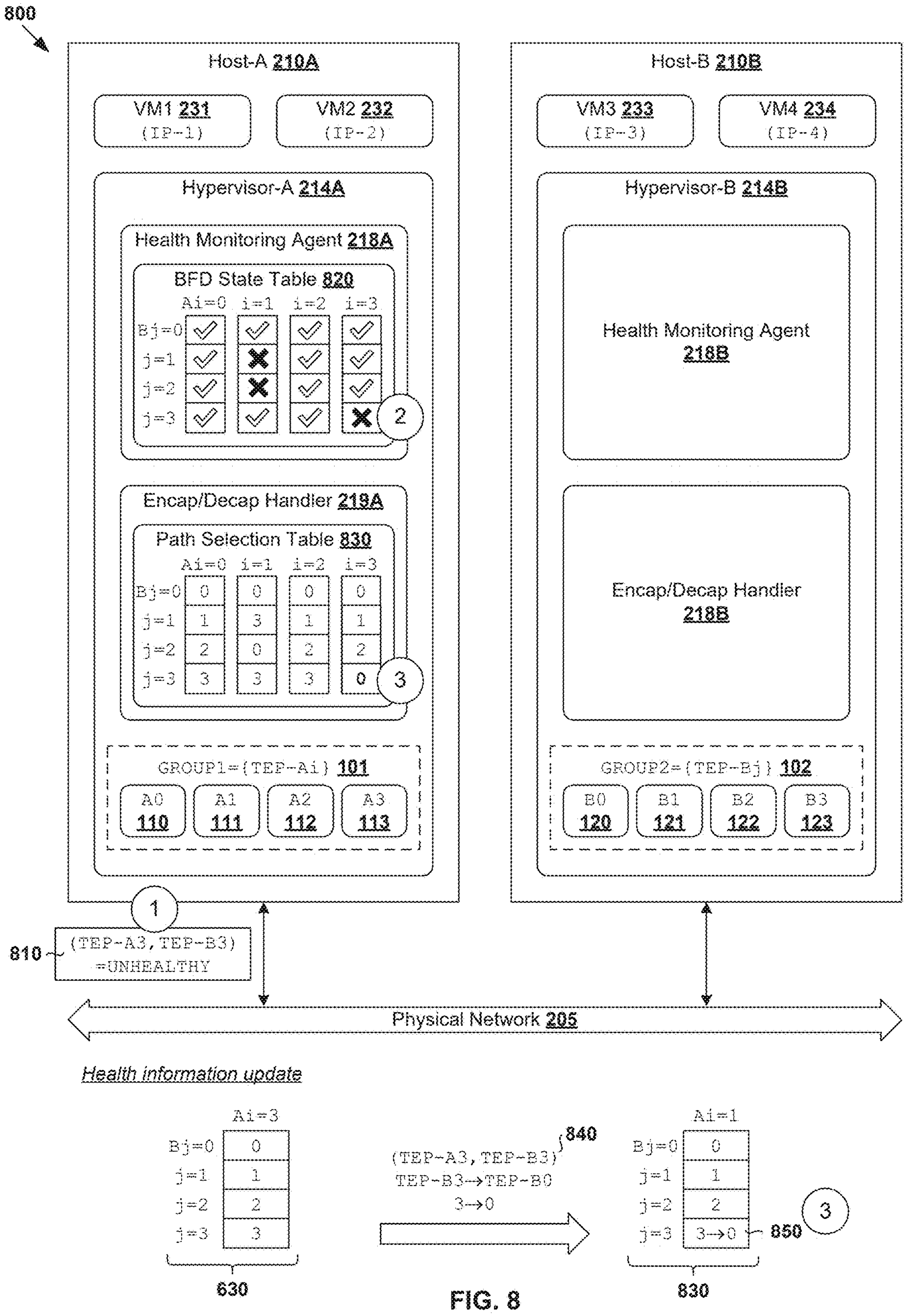
FIG. 8 is a schematic diagram illustrating a third example of health monitoring and health information update in an SDN environment.

According to examples of the present disclosure, healthy path selection may be performed at per-flow granularity. By supporting TEP high availability over TEP groups, different flows from the same VM (e.g., VM1 231) may be forwarded via different TEPs. An example will be described using FIGS. 8-9. Here, FIG. 8 is a schematic diagram illustrating third example 800 of health monitoring and health information update in SDN environment 100. FIG. 9 is a schematic diagram illustrating example 900 of health-aware overlay packet forwarding for a second packet flow using the example in FIG. 8.

At 810-830 in FIG. 8, in response to detecting a state transition from healthy to unhealthy for PATH-33, host-A 210A may update BFD state table 620 and path selection table 630 in FIG. 6. Updated BFD state table 820 in FIG. 8 may include an updated entry (i=3, j=3) indicating that PATH-33=unhealthy. Further, at 830, updated path selection table 830 may include an updated entry (i=3, j=3) storing k=0 instead of j=3 to replace PATH-ij=PATH-33 with healthy PATH-ik=PATH-30 (see 840-850).

Referring now to FIG. 9, at 910-940, in response to detecting an egress packet (P2) belonging to a second packet flow from VM1 231, host-A 210A (e.g., handler 218A) may map the egress packet to healthy PATH-30. This may involve calculating a hash value (see 920) based on tuple information extracted from P2 910, including SIP=IP-1 associated with VM1 231 and DIP=IP-4 associated with VM4 234. The hash value may then be mapped to updated entry (i=3, j=3) in updated path selection table 830. Based on k=0 stored in the updated entry (see 930), healthy PATH-ik=PATH-30 may be selected (see 940).

At 950 in FIG. 9, host-A 210A (e.g., handler 218A) may perform encapsulation before forwarding an encapsulated packet along PATH-30 towards host-B 210B. Encapsulated packet 950 may include P2 910 and an outer header (O2) that is addressed from (a) OUTER_SIP=IP-TEP-A3 associated with TEP-A3 113 to (b) OUTER_DIP=IP-TEP-B0 associated with TEP-B0 120. The outer header (O2) may also include source TEP group label="GROUP1" and/or destination TEP group label="GROUP2." At 960 in FIG. 9, in response to receiving the encapsulated packet via TEP-B0 120, host-B 210B may perform decapsulation to remove the outer header (O2) before forwarding the inner packet (P2) towards destination VM4 234.

In practice, SDN users value the ability to immediately and automatically recover virtual applications when underlay outages, brownouts, and service degradation occur. Examples of the present disclosure may be implemented to equip hosts 210A-B with the capability to automatically and rapidly failing over traffic on a per-flow basis based on responsive, per-path and end-to-end visibility. In at least some embodiments, the implementation of TEP groups 101-102 for high availability may provide fine-grained, health-based path selection.

Indirection Table

Depending on the desired implementation, path selection table 530/630/830 may be implemented using any data structure(s). One example is shown in FIG. 10, which is a schematic diagram illustrating example detailed implementation 1000 of path selection table 530/830. In this example, path selection table 530/830 may be mapped to a larger table, such as a 128-member indirection table 1010/1020. Similarly, only healthy TEP members of GROUP2 102 are included. In relation to the example in FIG. 5 (all paths are healthy), indirection table 1010 may include repeated indices 0 to M−1 (e.g., 0, 1, 2, 3 for all TEP-Ai). In relation to the example in FIG. 6 (PATH-11 and PATH-12 are unhealthy, indirection table 1020 may include repeated indices associated with remaining healthy paths from TEP-A1 111 (e.g., 0, 3, 0, 3).

For example, when an egress packet is detected, a hash value may be calculated based on certain fields (e.g., tuple information) in the egress packet. The hash value or least significant bits of the hash value (e.g., 0-127) may be used as an index to look up an entry in path selection table 530/830. The value found in the entry identifies the remote TEP. In other words, the hash value is used as an index, thereby providing an indirect way to map packets to different healthy paths. Unhealthy paths may be removed by simply updating entries in indirection table 1010/1020. This level of indirection (i.e., selecting a relatively small number of TEPs from a relatively larger table of indices) may be implemented to improve entropy for static flow distribution.

In practice, there may be various challenges associated with implementing per-flow failover. First, in terms of practicality, virtual networks have been conventionally based on tight coupling between overlay and underlay addresses. To address this, TEP groups 101-102 may be instantiated/configured on respective hypervisors 214A-B to facilitate overlay traffic steering based on health information on a per-flow basis. This allows each VNIC to send and receive traffic via multiple TEPs (see 110-113, 120-123). Instead of restricting each overlay address to a single TEP, multiple overlay addresses may be mapped to TEP group 101/102.

With the flexibility to select a pair of source and destination TEPs, each hypervisor 214A/214B (e.g., encapsulation module) may consider health information associated with multiple paths prior to the selection. Second, in terms of overhead, it is desirable to minimize additional datapath overhead. To address this, examples of the present disclosure may be implemented based on (a) BFD state table 520/620/820 that is maintained by health monitoring agent 218A and (b) path selection table 530/630/830 that is maintained by handler 219A for lookups. As shown using the examples in FIGS. 4-9, path selection table 530/630/830 may be updated out-of-band based on BFD session state change(s).

Container Implementation

Although explained using VMs, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples above, container technologies may be used to run various containers inside respective VMs 231-234. Containers are "OS-less", meaning that they do not include any OS that could weigh 10s of Gigabytes (GB). This makes containers more lightweight, portable, efficient, and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples may be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to the drawings.

The techniques introduced above may be implemented in special-purpose hardwired circuitry, in software and/or firmware in conjunction with programmable circuitry, or any combination thereof. Special-purpose hardwired circuitry may be in the form of, for example, one or more application-specific integrated circuits (ASICs), programmable logic devices (PLDs), field-programmable gate arrays (FPGAs), etc. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or any combination thereof.

Those skilled in the art will recognize that some aspects of the embodiments disclosed herein, in whole or in part, may be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples may be arranged in the device in the examples as described or may be alternatively located in one or more devices different from that in the examples. The units in the examples described may be combined into one module or further divided into a plurality of sub-units.

We claim:

1. A computer system, being a first computer system, to perform health-aware overlay packet forwarding in a software-defined networking (SDN) environment that includes the first computer system and a second computer system, wherein the first computer system comprises:

a processor; and a non-transitory computer-readable medium having stored thereon instructions that, when executed by the processor, cause the processor to perform the following:

monitor multiple paths between (a) a first tunnel endpoint (TEP) group supported by the first computer system and (b) a second TEP group supported by the second computer system, wherein the multiple paths include a first path and a second path;

update health information associated with the multiple paths to indicate that at least (a) the first path is healthy and (b) the second path is unhealthy; and in response to detecting an egress packet that is associated with a packet flow from a first virtualized computing instance supported by the first computer system to a second virtualized computing instance supported by the second computer system, based on the health information, map the egress packet to the first path, wherein the first path is between (a) a first TEP from the first TEP group and (b) a second TEP from the second TEP group; and generate and forward an encapsulated packet along the first path towards the second computer system, wherein the encapsulated packet includes the egress packet and an outer header that is addressed from the first TEP to the second TEP.

2. The computer system of claim 1, wherein the instructions for updating the health information cause the processor to:

in response to detecting a state transition associated with the second path from healthy to unhealthy, update the health information to replace the second path with the first path, wherein the second path is between (a) the first TEP and (b) a third TEP from the second TEP group.

3. The computer system of claim 2, wherein the instructions for updating the health information cause the processor to:

update the health information in the form of an entry in a path selection table, wherein the entry is updated to identify the second TEP instead of the third TEP to replace the second path with the first path.

4. The computer system of claim 3, wherein the instructions for mapping the egress packet to the first path cause the processor to:

map header information extracted from the egress packet to the updated entry in the path selection table; and select the first path based on the updated entry that identifies the second TEP.

5. The computer system of claim 4, wherein the instructions for mapping the egress packet to the first path cause the processor to:

based on the header information extracted from the egress packet, calculate and map a hash value to the updated entry in the path selection table.

6. The computer system of claim 3, wherein the instructions further cause the processor to:

in response to detecting a state transition associated with the second path from unhealthy to healthy, update the entry in the path selection table to identify the third TEP instead of the second TEP to replace the first path with the second path.

7. The computer system of claim 1, wherein the instructions for performing health monitoring cause the processor to:

establish multiple health monitoring sessions between the first TEP group and the second TEP group to monitor the respective paths, including (a) a first health monitoring session between the first TEP and the second TEP to detect that the first path is healthy and (b) a second health monitoring session between the first TEP and a third TEP from the second TEP group to detect that the second path is unhealthy.

8. A method for a first computer system to perform health-aware overlay packet forwarding in a software-defined networking (SDN) environment that includes the first computer system and a second computer system, wherein the method comprises:

monitoring, by the first computer system, multiple paths between (a) a first tunnel endpoint (TEP) group supported by the first computer system and (b) a second TEP group supported by the second computer system, wherein the multiple paths include a first path and a second path;

updating, by the first computer system, health information associated with the multiple paths to indicate that at least (a) the first path is healthy and (b) the second path is unhealthy; and in response to detecting an egress packet that is associated with a packet flow from a first virtualized computing instance supported by the first computer system to a second virtualized computing instance supported by the second computer system, mapping, by the first computer system, the egress packet to the first path instead of the second path based on the health information, wherein the first path is between (a) a first TEP from the first TEP group and (b) a second TEP from the second TEP group; and generating and forwarding, by the first computer system, an encapsulated packet along the first path towards the second computer system, wherein the encapsulated packet includes the egress packet and an outer header that is addressed from the first TEP to the second TEP.

9. The method of claim 8, wherein updating the health information comprises:

in response to detecting a state transition associated with the second path from healthy to unhealthy, updating, by the first computer system, the health information to replace the second path with the first path, wherein the second path is between (a) the first TEP and (b) a third TEP from the second TEP group.

10. The method of claim 9, wherein updating the health information comprises:

updating, by the first computer system, the health information in the form of an entry in a path selection table, wherein the entry is updated to identify the second TEP instead of the third TEP to replace the second path with the first path.

11. The method of claim 10, wherein mapping the egress packet to the first path comprises:

mapping, by the first computer system, header information extracted from the egress packet to the updated entry in the path selection table; and selecting, by the first computer system, the first path based on the updated entry that identifies the second TEP.

12. The method of claim 11, wherein mapping the egress packet to the first path comprises:

calculating and mapping, by the first computer system, a hash value to the updated entry in the path selection table, wherein the hash value is calculated based on the header information extracted from the egress packet.

13. The method of claim 10, wherein the method further comprises:

in response to detecting a state transition associated with the second path from unhealthy to healthy, updating, by the first computer system, the entry in the path selection table to identify the third TEP instead of the second TEP to replace the first path with the second path.

14. The method of claim 8, wherein monitoring the multiple paths comprises:

establishing, by the first computer system, multiple health monitoring sessions between the first TEP group and the second TEP group to monitor the respective paths, including (a) a first health monitoring session between the first TEP and the second TEP to detect that the first path is healthy and (b) a second health monitoring session between the first TEP and a third TEP from the second TEP group to detect that the second path is unhealthy.

15. A non-transitory computer-readable storage medium that includes a set of instructions which, in response to execution by a processor of a computer system, cause the processor to perform a method of health-aware overlay packet forwarding in a software-defined networking (SDN) environment that includes the computer system, being a first computer system, and a second computer system, wherein the method comprises:

monitoring multiple paths between (a) a first tunnel endpoint (TEP) group supported by the first computer system and (b) a second TEP group supported by the second computer system, wherein the multiple paths include a first path and a second path;

updating health information associated with the multiple paths to indicate that at least (a) the first path is healthy and (b) the second path is unhealthy; and in response to detecting an egress packet that is associated with a packet flow between a first virtualized computing instance supported by the first computer system and a second virtualized computing instance supported by the second computer system, based on the health information, mapping the egress packet to the first path instead of the second path, wherein the first path is between (a) a first TEP from the first TEP group and (b) a second TEP from the second TEP group; and generating and forwarding an encapsulated packet along the first path towards the second computer system, wherein the encapsulated packet includes the egress packet and an outer header that is addressed from the first TEP to the second TEP.

16. The non-transitory computer-readable storage medium of claim 15, wherein updating the health information comprises:

in response to detecting a state transition associated with the second path from healthy to unhealthy, updating the health information to replace the second path with the first path, wherein the second path is between (a) the first TEP and (b) a third TEP from the second TEP group.

17. The non-transitory computer-readable storage medium of claim 16, wherein updating the health information comprises:

updating the health information in the form of an entry in a path selection table, wherein the entry is updated to identify the second TEP instead of the third TEP to replace the second path with the first path.

18. The non-transitory computer-readable storage medium of claim 17, wherein mapping the egress packet to the first path comprises:

mapping header information extracted from the egress packet to the updated entry in the path selection table; and selecting the first path based on the updated entry that identifies the second TEP.

19. The non-transitory computer-readable storage medium of claim 18, wherein mapping the egress packet to the first path comprises:

based on the header information extracted from the egress packet, calculating and mapping a hash value to the updated entry in the path selection table.

20. The non-transitory computer-readable storage medium of claim 16, wherein the method further comprises:

in response to detecting a state transition associated with the second path from unhealthy to healthy, updating the entry in the path selection table to identify the third TEP instead of the second TEP to replace the first path with the second path.

* * * * *